United States Patent [19]

Wamser et al.

[11] Patent Number: 4,924,595
[45] Date of Patent: May 15, 1990

[54] MEASURING ARRANGEMENT FOR FORM MEASUREMENT

[75] Inventors: Manfred Wamser, Karlsruhe; Knud Overlach, Ettingen, both of Fed. Rep. of Germany

[73] Assignee: Dr.-Ing. Ludwig Pietzach GmbH & Co., Ettlingen, Fed. Rep. of Germany

[21] Appl. No.: 106,112

[22] Filed: Oct. 7, 1987

[30] Foreign Application Priority Data

Oct. 13, 1986 [DE] Fed. Rep. of Germany ....... 3634816

[51] Int. Cl.$^5$ .............................................. G01B 7/12
[52] U.S. Cl. ..................................... 33/542; 33/555.2
[58] Field of Search ............. 33/542, 543, 544, 178 R, 33/178 E, 178 F, 169 R, 563, 572; 73/118.1; 74/22 R, 22 A, 847, 89.15

[56] References Cited

U.S. PATENT DOCUMENTS

| | | | |
|---|---|---|---|
| 2,369,909 | 2/1945 | Mestas | 33/178 E |
| 2,495,797 | 1/1950 | Whitlock et al. | 33/178 E |
| 3,538,755 | 11/1970 | De La Cruz et al. | 33/178 E |
| 3,552,931 | 1/1971 | Doherty et al. | 74/22 R |
| 4,136,456 | 1/1979 | Yamauchi et al. | 33/178 R |
| 4,279,079 | 7/1981 | Gamberini et al. | 33/542 |
| 4,393,698 | 7/1983 | Pietzsch et al. | 73/118.1 |
| 4,661,037 | 4/1987 | Sugino et al. | 33/572 |

Primary Examiner—Thomas B. Will
Assistant Examiner—Patrick R. Scanlon
Attorney, Agent, or Firm—Klein & Vibber

[57] ABSTRACT

A measuring arrangement for form measurement of cylinders, comprises a measuring arm insertable into a cylinder space, a measuring sensor which is guided by the measuring arm, movable translatorily in the direction of a longitudinal axis of the measuring arm and driveable independently of the measuring arm in a circumferential direction, a sensing pin which is displaceable radially and along an axis of the measuring sensor and arranged for sensing a geometry of walls of cylinders, a driving arm which is movable translatorily and rotatably and having an end, the measuring arm being formed as a thin sensing body which is in operative connection with the end of the driving arm, formed bending-resistant, and extends parallel to the driving arm, the sensing body having an end which is spaced from the driving arm and carries the measuring sensor, and the measuring sensor being provided with the sensing pin.

5 Claims, 4 Drawing Sheets

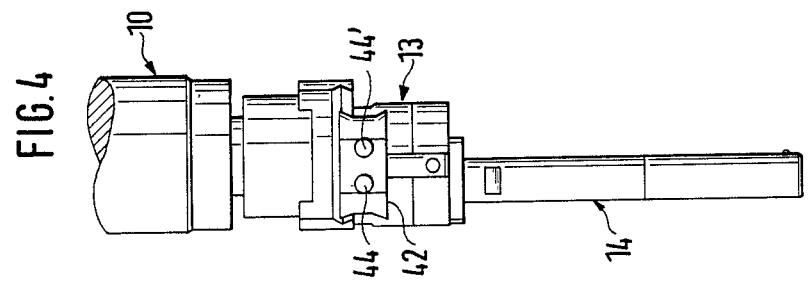
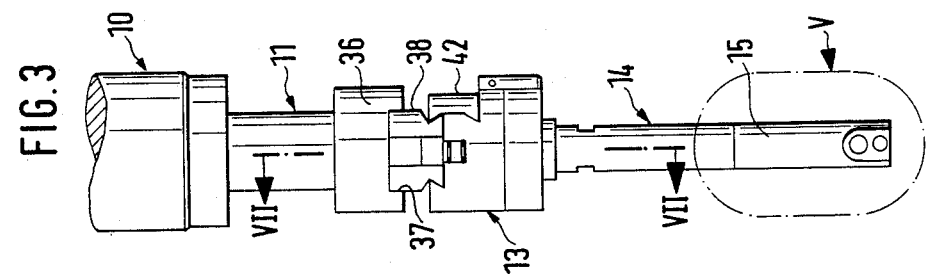
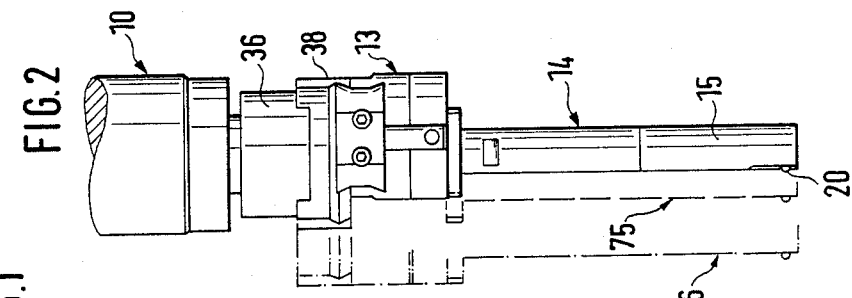
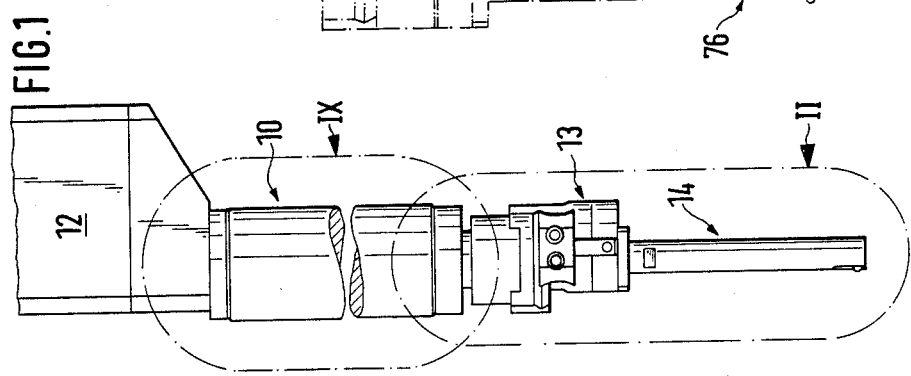

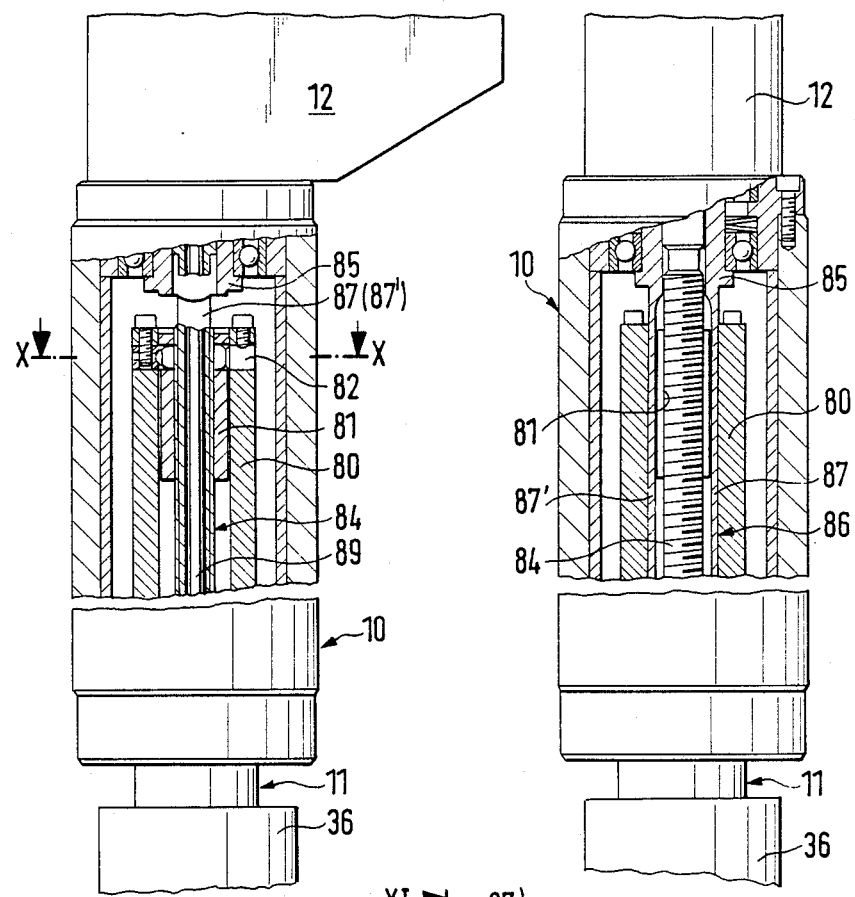
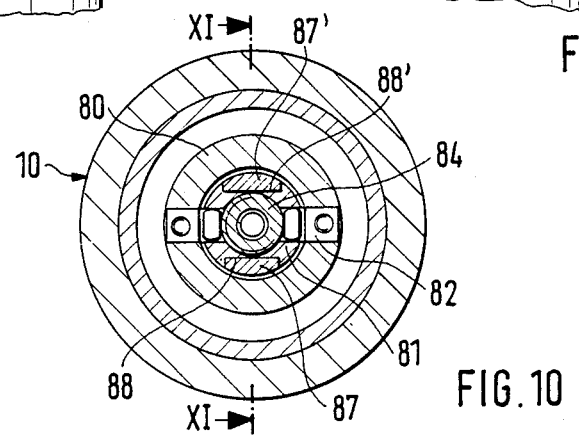
FIG. 9   FIG. 10   FIG. 11

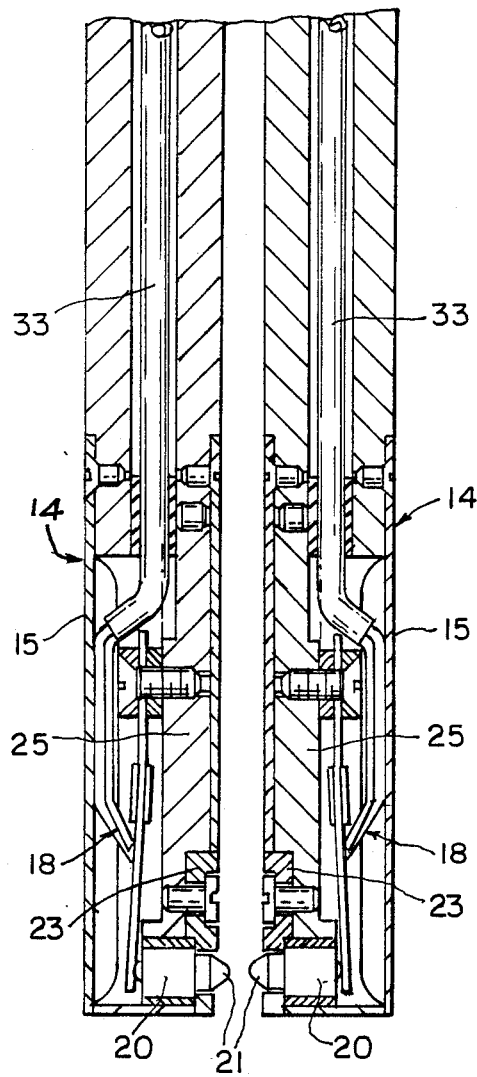
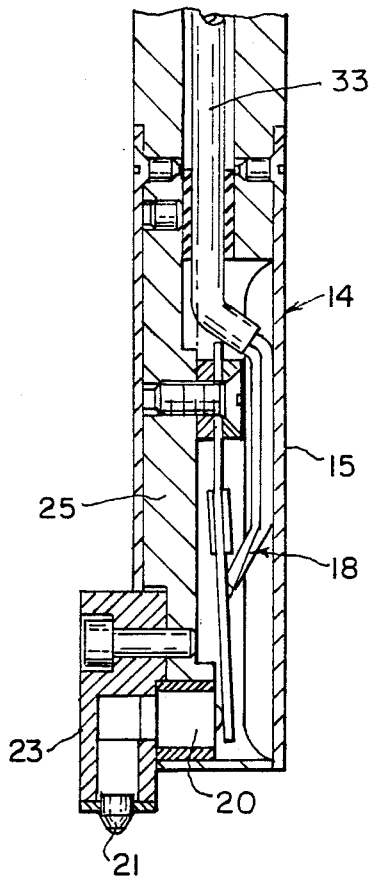
FIG. 12
FIG. 13

MEASURING ARRANGEMENT FOR FORM MEASUREMENT

BACKGROUND OF THE INVENTION

The present invention relates to a measuring arrangement for form measurement of cylinders. More particularly, it relates to a measuring arrangement of the above-mentioned type, having a measuring sensor which is guided by a measuring arm insertable into a cylinder space, and continuously driveable translatorily in the direction of the longitudinal axis of the measuring arm and in the peripheral direction, wherein a measuring sensor is provided with a sensing pin displaceble along its axis and serving for sensing the geometry of the cylinder walls.

A measuring arrangement of this type is known from the coassigned German Document DE-PS 3,024,331 which corresponds to U.S. Pat. No. 4,393,698. It serves for measurement of the cylinder distortion in the cylinder spaces and has a measuring arm which is insertable into cylinder spaces to be measured and driveable in a peripheral direction. A measuring sensor is driveable translatorily on the measuring arm along its axis and provided with a measuring pin which is radially guided in the housing of the measuring sensor and serves for sensing the geometry of the inner wall of a cylinder to be measured.

The known measuring arrangement is most successful for measurement of the cylinder distortion of cylinder spaces and especially for measurement of the cylinders of internal combustion engines. In view of the unavoidable radial expansion of the axially movable measuring sensor which is, however, arranged fixedly for a joint rotation with the measuring arm, which in turn is driveable in the peripheral direction, this measuring arrangement is suitable only for a measurement of cylinder spaces whose radial expansion does not exceed a predetermined diameter. It is, however impossible to measure with the known measuring arrangement those cylinder spaces which lie below a predetermined minimum diameter.

SUMMARY OF THE INVENTION

Accordingly, it is an object of the present invention to provide a measuring arrangement for a form measurement of thin cylinders, which avoids the disadvantages of the prior art.

More particularly, it is an object of the present invention to provide a measuring arrangement for form measurement of thin cylinders with diameters which lie far below the field of application of the known measuring arrangements.

In keeping with these objects and with others which will become apparent hereinafter, one feature of the present invention resides, briefly stated, in a measuring arrangement of the above-mentioned general type in which a measuring arm is formed as a sensing body which is bending-resistant and extends axis-parallel to a driving arm which is translatorily and rotatably movable by means of a drive motor, and a measuring sensor with a sensing pin is arranged on the sensing body at its free end which is spaced from the driving arm.

In contrast to the known measuring arrangements, the measuring arm in accordance with the present invention is a finger-like thin sensing body which is provided with a measuring sensor fixedly arranged at its end spaced from an axially and rotatably driven driving arm and which is driveable but axially and in a peripheral direction together with the measuring sensor. In view of the arrangement of the measuring sensor on the end of the thin, bending resistant sensing body, an extremely thin construction of the joint arrangement of the measuring arm and measuring sensor is provided as compared with the known measuring arrangement, and the means for guiding the measuring sensor are located in the region outside the cylinder space to be measured. This makes possible the measurements of extremely thin cylinder spaces.

Especially effective is the measurement of the extremely narrow cylindrical spaces when, in accordance with the construction of the invention, the measuring sensor is arranged inside the finger-like sensing body which extends from the end of the driving arm axis-parallel to the latter, and the tip of the sensing pin of the measuring sensor projects beyond the sensing body.

In accordance with a further embodiment of this construction, the tip of the testing pin of the measuring sensor projects radially beyond the sensing body. In accordance with another embodiment, which permits measurements of for example end-side closing walls of cylinder spaces, the tip of the sensing pin extends axially beyond the sensing body. (see FIG. 12)

A further important feature of the present invention is that the measuring sensor has a leaf spring which is provided with expansion-measuring strips and extends substantially in the longitudinal direction of the sensing body. The leaf spring is clamped in the sensing body with its end which is spaced from the sensing pin, while at its other end which is spaced from the clamping point it engages the sensing pin which extends with its tip beyond the sensing body.

Such a leaf spring which, in dependence upon movements of the sensing pin along its axis, performs greater or smaller bendings, can maintain the extremely small return force so that during a measuring process only the smallest bending forces act on the leaf spring. Therefore the sensing body which extends from the end of the driving arm axis-parallel to it and is bending-resistant, remains practically free from bending loads. In the event of the sensing pin which extends radially to the sensing body and is movable in a respectively arranged guide, the end of the sensing pin which is spaced from its tip engages perpendicularly to the longitudinal direction the leaf spring at its free end, so that in addition to minimal bending moments provided via the clamping point of the leaf spring in the sensing body as bending forces, the frictional forces which can act during the actual displacement of the sensing pin perpendicularly to the longitudinal axis of the sensing body are also extremely small. With the sensing pin, which is guidingly movable in the respective direction of the sensing body, the sensing pin can act with its end spaced from its tip against a respective offset of the leaf spring at its end which is spaced from the clamping point.

In accordance with another advantageous embodiment of the invention, the sensing body is connected with the driving arm through a carriage which is displaceable radially to the axis of rotation of the driving arm and is thereby adjustable within a predetermined adjusting region with different radii of the cylinder to be measured.

In accordance with a further advantageous feature of the present invention, the measuring sensor with the sensing pin which projects with its tip beyond the sensing body, is adjustable relatively to the driving arm about the longitudinal axis of the sensing body in a peripheral direction by 180°. Thereby with the direction selection of the sensing pin in one or another adjusting position, a cylindrical outer form or inner form can be measured.

In the last mentioned embodiment, the sensing body can be supported rotatably relative to the carriage which provides its radial adjustment, about its longitudinal axis by 180° and can be adjustable. On the other hand, the measuring sensor can be rotatably supported relative to the portion of the sensing body which is connected for transportation with the driving arm, about the longitudinal axis of the sensing body by 180°, and can be fixable in the respective adjusted positions.

In accordance with a further advantageous embodiment of the invention, two adjustable sensing bodies are operatively connected with the end of the driving arm so that they are arranged at opposite distances relative to one another and adjustable in their radial position relative to the axis of rotation of the driving arm. The sensing bodies are provided with measuring sensors at their ends spaced from the driving arm, which have oppositely facing tips of their pins. Such a construction makes possible measurements of the inner and outer contours, as well as the wall thicknesses of the cylinder bushes in an especially a simple manner. (See FIG. 13)

In accordance with still another embodiment which leads to a simple and advantageous construction of the arrangement, the driving arm from which the measuring arm is formed extends as a narrow and bending-resistant sensing body and, has a guiding sleeve which is in driving connection with the driving motor. The measuring arm is rotatably and axially movably received in the interior of a guiding pipe and is connected with a spindle nut which cooperates with a spindle driveable by a second drive motor so as to be fixed for rotation and in an axial direction. The spindle nut and the guiding sleeve can be connected with one another through a driver which engages in the guiding sleeve in a form locking manner, to be fixed for rotation and in a axial direction. In the aforedescribed arrangement the spindle and the cooperating spindle nut form the translatorily drive of the driving arm, while its rotary drive is performed from the drive motor which is in driving connection with the guiding sleeve.

In accordance with an especially advantageous feature of the present invention, the driving connection between the guiding sleeve of the driving arm and one of the driving motor is performed by a driving shaft which is driveable by the driving motor and extends axially to the spindle and has a drive fork extending along the spindle inside the guiding sleeve. This drive fork cooperates with the guiding sleeve and/or the spindle nut to be fixed for rotation. In view of the operation of the drive fork with the spindle nut and/or with the guiding sleeve, the guiding sleeve and the spindle nut are coupled with the driving shaft so as to be fixed for rotation, but the spindle nut is axially movable within the limits provided by the longitudinal extension of the drive fork. Advantageously, the drive fork can form-lockingly engage with the parallel fork arms into the longitudinal grooves of the spindle nut. This leads to a simple construction and a precise cooperation of the parts which are longitudinally movable in one another and coupled in the peripheral direction. It is also advantageous that the drive fork of the drive shaft is closed at both ends and supported on both ends.

BRIEF DESCRIPTION OF THE DRAWINGS

The novel features of the present invention are set forth in particular in the appended claims. The invention itself, however, will be best understood from the following description of the preferred embodiments which is accompanied by the following drawings.

FIG. 1 is a schematic view showing measuring arrangements in accordance to the present invention with a sensing body which is connected by means of a carriage to the end of a rotatable and axially movable drive arm to be fixed for rotation and in axial direction, with a measuring sensor arranged on the sensing body at its ends spaced from the driving arm, with a sensing pin projecting with its tip radially beyond the sensing arm;

FIG. 2 is a fragmentary view of FIG. 1 which is identified in FIG. 1 with reference numeral II at an enlarged scale of the sensing body and the carriage which provides its connection with the driving arm;

FIG. 3 is a view showing the sensing body in axial displaced position and in a position turned by 90° relative to FIG. 2;

FIG. 4 is a view showing an adjustment of the sensing body in a position which is turned by 180° relative to FIG. 2 about the longitudinal axis of the sensing body relative to the carriage;

FIG. 9 is a fragmentary view partially sectioned of fragment IX in FIG. 1 of the drive of the driving arm which is rotatably and axially movably arranged in a guiding pipe attached to the housing;

FIG. 10 is a view showing a cross section taken along the line X—X in FIG. 9 through the guiding pipe and a guiding sleeve of the driving arm with an associated spindle nut;

FIG. 11 is a partial longitudinal section which is taken along the line XI—XI in FIG. 9 and is offset by a 90° relative to the FIG. 9, through the driving arm and the guiding pipe which supports the latter;

FIG. 12 is a schematic view of an alternate embodiment of the free end of the sensing body; and

DESCRIPTION OF PREFERRED EMBODIMENTS

Figure 7:
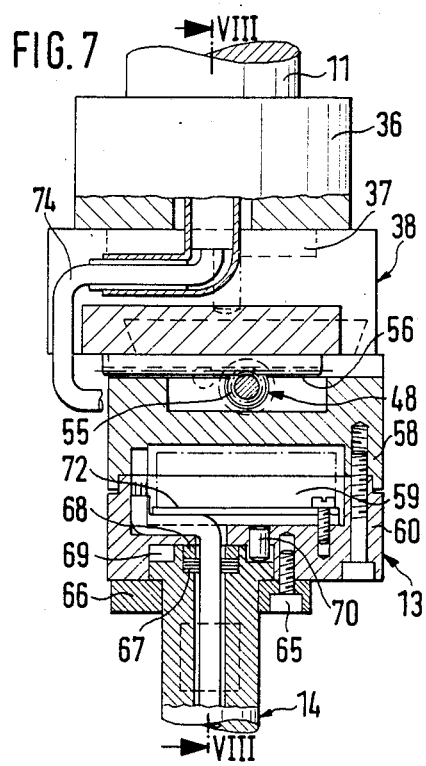
FIG. 7 is a view showing a longitudinal section taken along the line VII—VII in FIG. 3 through the carriage which provides the adjustable connection of the sensing body with a driving arm.

A measuring arrangement in accordance with the present invention has a driving arm 11 FIG. 3 which is axially movably and rotatably supported in a guiding pipe 10 as will be explained in detail herein below. The driving arm 11 is rotably driven by a not shown drive motor which is mounted in a housing 12 and is also movable in an axial direction. A finger-like bending-resistant sensing body 14 is connected with an end of the driving arm by means of a carriage 13 which will be described in detail herein below. The body 14 is fixed for rotation and in an axial direction on the carriage 13.

Figure 6:
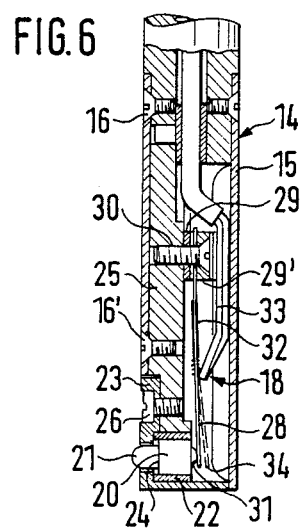
FIG. 6 is a view showing the longitudinal section taken along the line VI—VI in FIG. 5 through the end of the sensing body with the measuring sensor.
Figure 5:
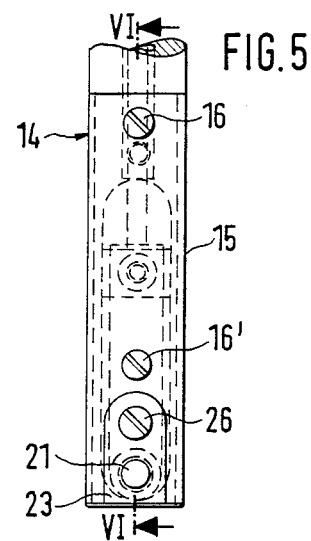
FIG. 5 is a fragmentary view showing an enlarged fragment V in FIG. 3 of the part of the sensing body which is spaced from the driving arm and in which the measuring sensor is arranged.

The sensing body 14 extends parallel to the driving arm and projects from it or from a carriage guide 13 arranged on end of the driving arm 11. A protective pipe 15 is arranged on the sensing body 14 at its free end which is spaced from the driving arm 11, and connected with the sensing body 14 by sinking screws 16 and 16′ (FIG. 6). The pipe 15 surrounds a measuring sensor 18.

The measuring sensor 18 has a sensing pin 20 extending radially at the end of the sensing body which is spaced from the driving arm 11. The sensing pin 20 has a tip 21 which radially projects beyond the protective pipe 15 arranged on the end of the sensing body 14. The sensing pin 20 is displacable in a guiding sleeve 22 along its axis which extends perpendicular to the longitudinal axis of the sensing body. The movability of the sensing pin radially outwardly is limited by a holding plate 23, through an opening of which the sensing pin tip 21 extends and which forms an abutment for a shoulder 24 providing a transition to the tip 21 of the sensing pin 20. The guiding sleeve 22 and the holding plate 23 are received in a holding member 25 of the sensing body which is surrounded by the protective pipe 15, and the holding plate 23 is usually connected with this end portion by means of a sinking screw 26.

A leaf spring 28 extends inside the protective pipe 15 from the end portion 25 of the sensing body, substantially in direction of the longitudinal axis of the sensing body. The end which confronts the driving arm 11 is received between clamping plates 29 and 29′ and is firmly clamped to the end portion 25 by by means of a mounting screw 30. The other end of the leaf spring 28 lies on a semi-spherical head 31 of the sensing pin 20, so that the sensing pin is radially outwardly pressed by the leaf spring 28 with minimal biasing to an end position determined by an abutment of its shoulder 24 against the holding plate 23. During displacement of the sensing pin radially inwardly the leaf spring performs limited bending.

The bending of the leaf spring 28, for example in dependence radial displacement of the sending pin which takes place relative to the cylinder to be measured, is detected by means of expansion-measuring strips 32 which are glued on the leaf spring. Through conductors 33, the expansion measuring strips 32 are connected with further respective devices for processing of the thusly produced electrical signals. A deviated position of the leaf spring 28 is illustrated in FIG. 6 in broken lines.

Figure 8:
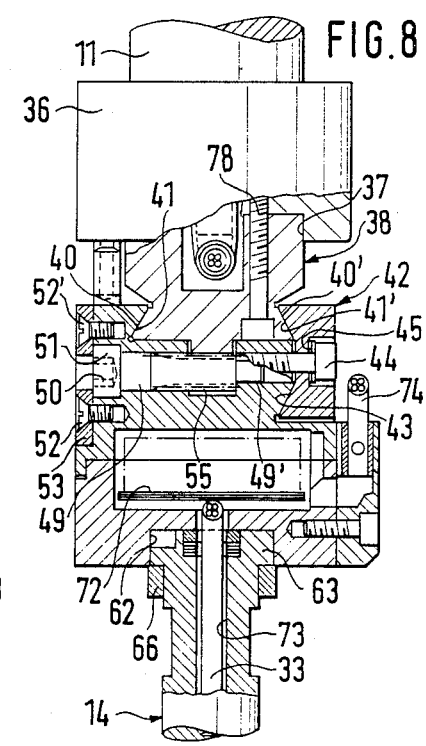
FIG. 8 is a view showing a longitudinal section through the carriage, but taken along the line of VIII—VIII in FIG. 7.

The rotary-fixed and axially-fixed, but adjustable connection of the sensing body 14 with the driving arm 11 is shown in FIGS. 2–4 in connection with FIGS. 7–8.

A connecting sleeve 36 is connected with the end of the driving arm 11 to be fixed for rotation and axial displacement. At its side which is spaced from the driving arm, it is provided with a guiding recess 37 which extends perpendicularly to the longitudinal axis of the driving arm 11 in which a guiding piece 38 is received. The guiding piece 38 at its side which is spaced from the connecting sleeve, has a dove-tail guide 40, 40′ which extends transversely to the longitudinal axis of the driving arm and parallel to the guiding recess 37. The guide 40, 40′ is engaged by guiding surfaces 41, 41′ of the carriage 13. One guiding surface 41 is arranged in the slide fixedly, while the other guiding surface 41′ is formed by a part of the guiding strip 42 which is supported on the carriage by a guiding surface 43 symmetrically relative to its longitudinal extension, and which is connected with the same by means of two mounting screws 44, 44′(FIG. 4) with interposition of a plate spring stack 45.

A rotatably supported adjusting pin 48 extends in the carriage from the side which is spaced from the guiding strip 42, in a direction which is transversed relative to the dove-tail guide and perpendicularly to the longitudinal axis of the driving arm 11. It is supported inside the carriage 13 with precisely guided pin portions 49 and 49′ and has a pin head 51 which is provided with an inner key insertion surface 50. The pin head is received in a sunken recess provided in the carriage 13 and secured at the outer side by a holding plate 53 which is mounted on the carriage by means of sunken screws 52 and 52′ (FIG. 2). The holding plate 53 has a bore which is in alignment with an inner key insertion surface 50, so that a key with an outer hexagon can be inserted through the bore into the key insertion opening to provide the rotation of the adjusting pin 48. The adjusting pin is provided with a toothing 55 between the pin portion 49, 49′ which provides the rotary support of the adjusting pin 48 in the carriage. The toothing 55 meshes with the toothing of a toothed rod 56 which extends parallel to and between the dove-tail guiding surfaces 40, 40′ of the guiding piece 38 and is integral with the latter.

A part 58 of the carriage 13, which supports the adjusting pin 48 is fixably connected with a carriage part 60 so as to form an inner chamber 59, in which a cylindrical bearing recess 62 extends into the underside of the carriage part 60 which is spaced from the driving arm 11 and receives a supporting portion 63 of the sensing body 14. The supporting portion 63 extends as a ring flange radially over the sensing body 14 and is secured in its operates position by means of a holding plate 66 which is fixedly connected with the above mentioned carriage part 60 by mounting screws 65. A plate spring stack 67 is received in an end-side inner recess of the sensing body 14 in the region of the supporting portion 63. It is supported on the carriage part 60 through an intermediate ring 68 and provides a clearance-free support for the sensing body 14 on the carriage part 60. An annular groove 69 extends from one end side in the supporting portion 63 of the sensing body 14. An abutment pin 70, which is firmly received in the carriage 60, projects into the annular groove 69. This annular groove 69 extends over such a peripheral region that the sensing body 14 is rotatable relative to the carriage about its longitudinal axis by 180°, so that it is possible to provide an annular adjustment of the sensing pin tip 21 of the measuring sensor to positions which are shown in FIGS. 2–4 which are offset relative to one another by 180°.

A supporting plate 72 with a not shown amplifying members is located in the inner chamber 59 which is formed between two carriage parts 58, 60. The non-illustrated amplifying members are conductively connected with expansion-measuring strips 32 which are glued on the leaf spring 28 via electrical conductive connections 33, shown on FIGS. 7–8 and extending through a central bore 73 of the sensing body 14. FIG. 8 shows a conductor 74 extending from the amplifying elements for transmitting the measuring signals to a non-illustrated computer.

During an adjustment of the measuring arrangement to the position shown in FIG. 7 for measurement of the inner contour of a cylinder, the radial adjustment of the sensing body 14 is provided in correspondence with the value of the diameter of the cylinder to be measured in a simple manner, by rotation of the adjusting pin 48 supported rotatably, but axially immovably in the carriage part 58, in one or another direction. With a slight release of the guiding strip 42, which engages with the dove-tail guide of the guiding piece 38, the radial adjustment of the sensing body 14 is facilitated. By the engagement of the toothing 55 with the toothed rod 56 of the guiding piece 38, the rotation of the adjusting pin 48 produces a lateral displacement of the carriage 13 along the dove-tail guide and thereby radially relative to the driving arm 11. A maximum possible radial adjustment of the sensing body 14 is identified in broken lines with reference number 75 in FIG. 2.

An extension of the usable region of the measuring arrangement to the position of the sensing body shown in FIG. 2 in broken lines and identified with reference number 76, is possible in that the guiding piece 38, which is received in the guiding recess 37, is connected with the connecting sleeve 36 asymmetrically to the longitudinal axis of the driving arm 11. The symmetrical arrangement of the guiding piece 38 relative to the above-mentioned longitudinal axis is achieved after the removal of the carriage 13 from the guiding piece 38. The mounting screws 78 which connect the guiding piece 38 to the connecting sleeve are removed, and the guiding piece 38 after the radial displacement by at least one pitch value, is displaced in the guiding recess between the mounting screw receivable openings radially in the guiding recess and then is again mounted by the mounting screws 78 in the radially adjusted position.

The adjustment of the measuring arrangement for measurement of the outer contour of a cylinder is shown in FIG. 4. For this adjustment the immovable driving arm 11 of the sensing body 14 is turned with its supporting portion 63 received in the supporting opening 62 of the carriage 13, about its longitudinal axis by 180°, so that the sensing pin 20 of the measuring sensor 18 with its pin 21 has a position which is diametrically opposite to the end position of FIG. 2. The turning of the sensing body 14 relative to the carriage 13 is limited by the cooperation of the guiding pin 70 with the peripheral groove 69 in the supporting portion 63 of the sensing body 14. The sensing body 14 is held in the respective adjusted position frictionally by the clamping force provided from the plate spring stack 67. The radial adjustment for adaptation to the diameter of an outer cylinder to be measured is performed in a manner which is illustrated in FIGS. 2 and FIGS. 9-11.

The driving arm 11 with the connecting sleeve 36, which is arranged on the end extending beyond the housing fixed to the guiding pipe 10, has a guiding sleeve 80 which is received rotably and axially movably in the guiding pipe 10. A spindle nut 81 is received in the guiding sleeve 80 at another end. The spindle nut 81 and the guiding sleeve 80 are connected to one another for joint rotation and axial displacement by a driver 82 which engages in a radial opening of these parts in a form-looking manner. The driver 82 is held by holding screws 83 in its position for providing the rotably and axially-fixed connection of the spindle nut 81 with the guiding sleeve 80. A spindle 84 which mashes with the spindle nut 81 extends inside it and is in a driving connection with not shown drive motor. A driving shaft 85 which is in driving connection with another driving motor extends axially to the spindle 84. The driving shaft 85 surrounds the spindle 84 and has a driver fork 86 which extends in the guiding sleeve 80 along the spindle 84. The driver fork 86 has 2 parallel fork arms 87, and 87' which engage in the longitudinal grooves 88, 88' of the spindle nut 81 in a form-locking manner. These longitudinal grooves, as specifically shown in FIG. 10, are offset by 90° in a peripheral direction relative to the drivers 82 which provide the rotatably and axially-fixed connection between the guiding sleeve 80 and the spindle nut 81. The spindle 84 is formed as a hollow spindle. A conductor 89 extends through the hollow spindle 84 and leads to the measuring arm 14. The nature of this conductor is of no interest to the invention.

When the spindle 84 which in the driving connection with one of the two driving motors is rotatably driven, the spindle nut 81 which cooperates with the spindle performs an axial movement which in view of the jointly rotatable and axially-fixed coupling of the spindle nut 81 with the guiding sleeve 80, corresponds to an extension and retraction of the measuring arm 11. This axial movement takes place without any problems through the rotating drive provided from the other driving motor through the driving shaft 85 with the driver fork 86. The rotary connection between the driving shaft 85 which is in driving connection with the other driving motor, and the driving sleeve 80 of the driving arm, is maintained by the form arm 87, 87' of the driver fork 86 which are engaged in the longitudinal grooves 88, 88' of the spindle nut 81, over the whole axial movement region of the guiding sleeve 80 or the driving arm 11.

The present invention is not limited to the details shown, since there are various modifications and structural changes which are possible without departing in any way from the spirit of the present invention.

We claim:

1. A measuring arrangement for form measurement of cylinders, comprising a measuring arm insertable into a cylindrical space; a measuring sensor mounted on said measuring arm and being insertable via said measuring arm into said cylindrical space, said arm is movable translatorily with respect to the longitudinal axis of said measuring arm and is driveable independently of said translatory movement in a circumferential direction; a sensing pin displaceably mounted in said measuring arm and arranged for sensing a geometry of walls of cylinders; a driving arm which is movable translatorily and rotatably in said arrangement and having an end connected to said measuring arm, being formed as a relatively thin sensing body which is in operative connection with said end of said driving arm, and being formed bending-resistant, and extends parallel to said driving arm, said sensing body having a free end and said sensing pin being operatively mounted adjacent the free end of said thin sensing body; said driving arm has a guiding sleeve; and further comprising a first driving motor with which said guiding sleeve is in driving connection; a guiding pipe in which said guiding sleeve is arranged rotatably and axially movably; a spindle coaxially mounted in said guiding sleeve; a second drive motor driveably connected to said spindle and a spindle nut which cooperates with said spindle and is connected with said guiding sleeve to be fixed for joint rotation and axial connection therewith; and a driver which engages in said guiding sleeve in a form-locking manner, said drive connecting said spindle nut to said guiding sleeve for joint rotation and to be axially fixed therewith;

and further comprising a driving shaft coaxially and rotatably mounted in said driving arm which provides the driving connection between said guiding sleeve of said driving arm and said first mentioned driving motor wherein said guiding sleeve is driven by said first mentioned driving motor and extends coaxially to said spindle, said driving shaft being provided with a drive fork which extends along said spindle inside said guiding sleeve.

2. A measuring arrangement as defined in claim 1, wherein said drive fork cooperates with said guiding sleeve for joint rotation therewith.

3. A measuring arrangement as defined in claim 1, wherein said drive fork cooperates with said spindle nut for joint rotation therewith.

4. A measuring arrangement as defined in claim 1, wherein said spindle nut has longitudinal grooves, said drive fork having fork arms which extend parallel to one another and engage in said longitudinal grooves of said spindle nut in a form-locking manner.

5. A measuring arrangement as defined in claim 4, wherein said spindle extends between said fork arms of said drive fork of said first mentioned drive shaft.

* * * * *

UNITED STATES PATENT AND TRADEMARK OFFICE
CERTIFICATE OF CORRECTION

PATENT NO.   : 4,924,595
DATED        : May 15, 1990
INVENTOR(S)  : Manfred Wamser and Knud Overlach It is certified that error appears in the above-identified patent and that said Letters Patent is hereby corrected as shown below:

Cover page, column 1, item [73], lines 1-2, delete "Dr.-Ing. Ludwig Pietzach GmbH & Co." and substitute therefor —BBC Pat Messtechnik GmbH—.

Signed and Sealed this

Sixth Day of November, 1990

Attest:

HARRY F. MANBECK, JR.

*Attesting Officer*  *Commissioner of Patents and Trademarks*